US008939081B1

(12) United States Patent
Smith et al.

(10) Patent No.: US 8,939,081 B1
(45) Date of Patent: Jan. 27, 2015

(54) LADAR BACKTRACKING OF WAKE TURBULENCE TRAILING AN AIRBORNE TARGET FOR POINT-OF-ORIGIN ESTIMATION AND TARGET CLASSIFICATION

(71) Applicant: Raytheon Company, Waltham, MA (US)

(72) Inventors: Duane Donald Smith, Rancho Palos Verdes, CA (US); Robert William Byren, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 215 days.

(21) Appl. No.: 13/741,804

(22) Filed: Jan. 15, 2013

(51) Int. Cl.
*F42C 13/02* (2006.01)
*F42C 13/04* (2006.01)
*G01N 21/84* (2006.01)
*G01S 13/38* (2006.01)
*G01S 13/86* (2006.01)

(52) U.S. Cl.
USPC ............ 102/213; 102/214; 89/1.11; 356/342; 356/438; 342/54; 342/107

(58) Field of Classification Search
USPC ............ 102/213, 214; 89/1.11; 235/411, 413, 235/414, 417; 342/54, 107, 109, 113, 114, 342/147, 195, 450, 451; 356/342, 438
See application file for complete search history.

(56) References Cited

U.S. PATENT DOCUMENTS

| 4,359,640 | A | | 11/1982 | Geiger |
| 4,735,503 | A | | 4/1988 | Werner et al. |
| 4,817,495 | A | * | 4/1989 | Drobot ........................... 89/1.11 |
| 5,138,322 | A | * | 8/1992 | Nuttall ........................ 342/126 |
| 5,170,218 | A | | 12/1992 | Keene |
| H1231 | H | * | 9/1993 | Richards ...................... 356/5.03 |
| 5,724,040 | A | * | 3/1998 | Watnick ...................... 342/26 D |
| 6,057,915 | A | | 5/2000 | Squire et al. |
| 6,424,408 | B1 | | 7/2002 | Ooga |
| 2002/0042673 | A1 | * | 4/2002 | Ooga ............................ 701/120 |
| 2005/0012657 | A1 | | 1/2005 | Mohan |
| 2005/0030219 | A1 | * | 2/2005 | Friedrich et al. ................ 342/68 |
| 2006/0061753 | A1 | * | 3/2006 | Harris et al. .................. 356/4.05 |
| 2006/0262324 | A1 | * | 11/2006 | Hays et al. ..................... 356/519 |
| 2008/0303717 | A1 | * | 12/2008 | Durban et al. ................ 342/371 |
| 2009/0276105 | A1 | * | 11/2009 | Lacaze et al. ..................... 701/2 |

FOREIGN PATENT DOCUMENTS

CN           102721967 A    10/2012

* cited by examiner

Primary Examiner — Bret Hayes
(74) Attorney, Agent, or Firm — Eric A. Gifford

(57) ABSTRACT

A weapon-locating ladar system estimates a backward trajectory of an airborne target by using flow field measurements to follow the wake turbulence trailing the airborne target from a position at which the target is detected backwards until the wake is no longer observable. The system may use the backward trajectory to estimate the point-of-origin of the target. The system may also use the flow field measurements along the backward trajectory to classify the target. Target classification may be used to refine the point-of-origin estimate, to influence counter-fire or to adapt the flow field measurements.

24 Claims, 11 Drawing Sheets

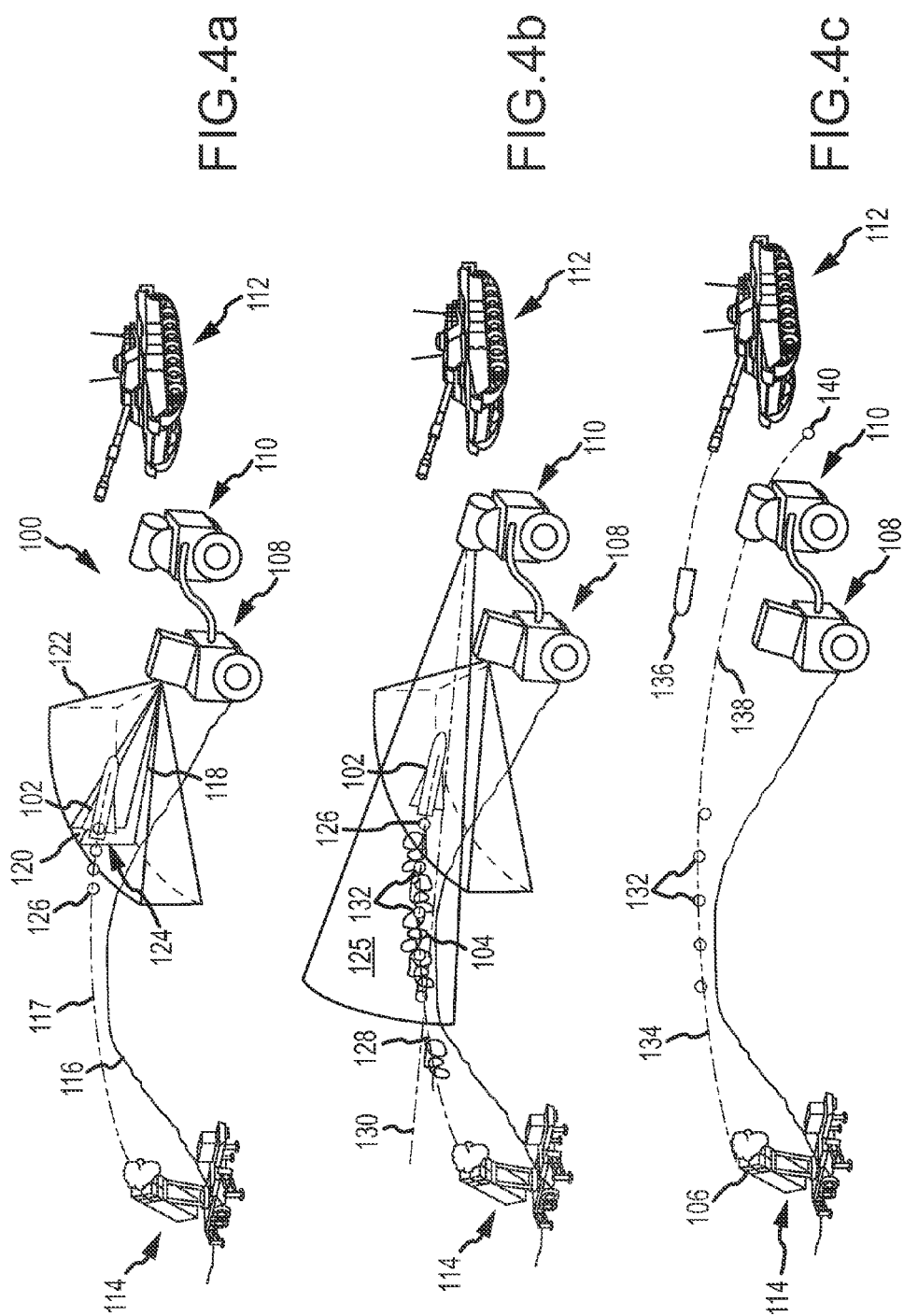

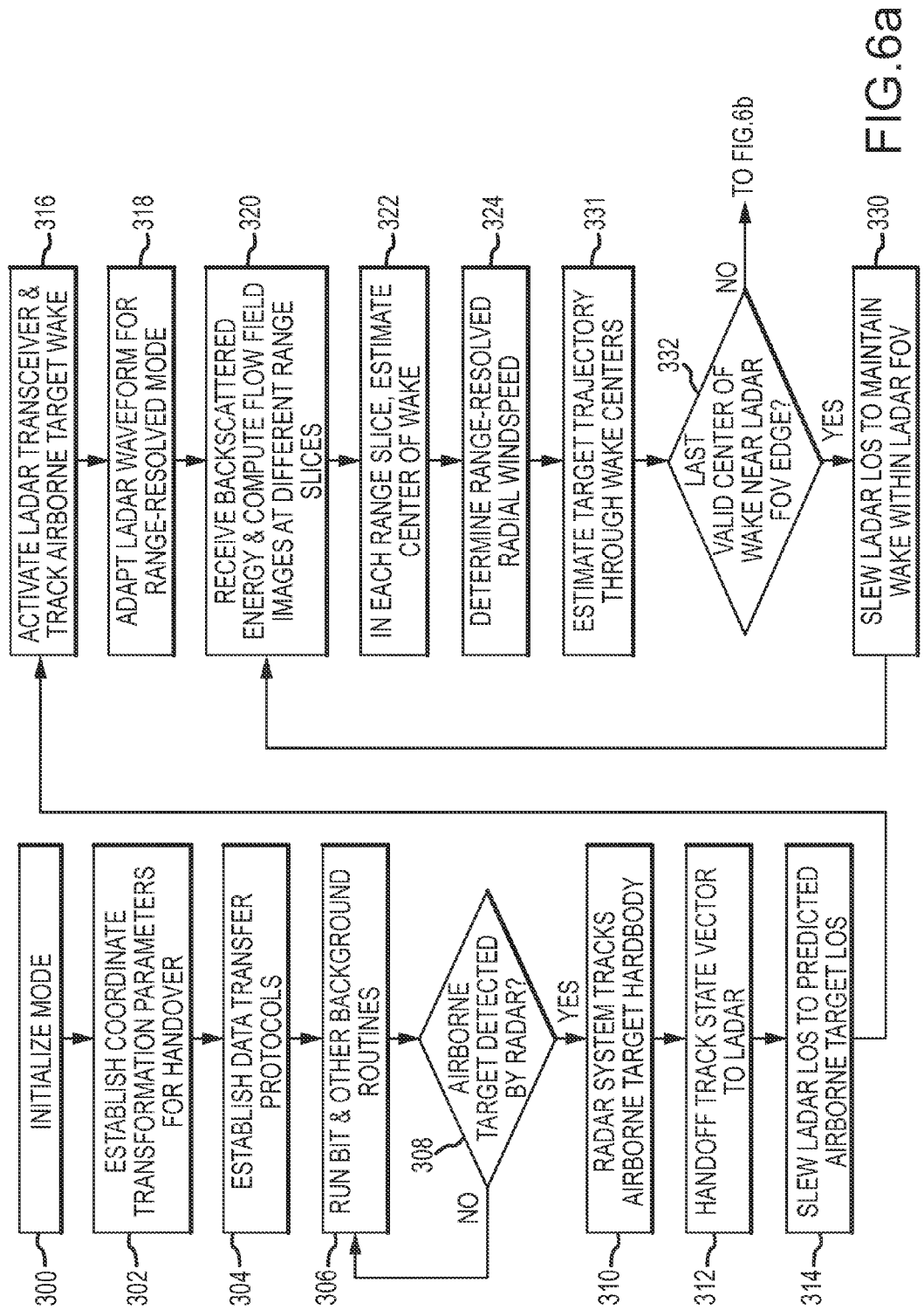

1

LADAR BACKTRACKING OF WAKE TURBULENCE TRAILING AN AIRBORNE TARGET FOR POINT-OF-ORIGIN ESTIMATION AND TARGET CLASSIFICATION

BACKGROUND OF THE INVENTION

1. Field of the Invention

This invention relates to weapon-locating systems that track the path of incoming airborne targets back to the source of fire and position of the weapon, and more specifically to a new class of weapon-locating lidar (LIght Detection And Ranging) aka ladar system that uses flow field measurements to backtrack the wake turbulence trailing the airborne target from the point the target is detected backwards to estimate a backward trajectory. The backward trajectory can be used to estimate the point-of-origin (POO) of the target. The flow field measurements may also be used to classify the airborne target, which can be used to refine the POO estimate or to influence the counter-fire directed at the POO.

2. Description of the Related Art

Weapon-locating radar (RAdio Detection And Ranging) systems track the path of incoming projectiles including shells, rockets, mortars, missiles etc., and calculate the point from which the projectile was fired. These weapon-locating systems use Doppler radar to detect the hardbody of the projectile and then track the position of the hardbody forwards over a latter portion of the projectile trajectory. These systems typically assume a ballistic trajectory to backtrack along the estimated flightpath to the Earth intercept to estimate the point-of-origin (POO) for effective counter-fire tactics. The weapon-locating system also predicts impact zones and transmits data to friendly forces, allowing time for effective defense measures. Sized for easy transport, weapon-locating systems are valued for their accuracy, mobility, reliability and low life-cycle costs. Weapon-locating radar systems are currently available in two general classes of sensors, intermediate and long range. Examples include Raytheon's TPQ-36 Firefinder system is specifically designed to counter medium range enemy weapon systems out to a range of 24 kilometers, while the TPQ-37 Firefinder system can locate longer-range systems, and even surface launched missiles, out to 50 kilometers.

Referring now to FIGS. 1a-1c, in a typical battlefield scenario an enemy artillery piece 10 hidden behind a hill, dune or treeline 12 fires a projectile 14 at friendly forces. To direct effective counter-fire at the artillery piece 10, the location of the artillery piece as the POO of the projectile fire must be determined. A weapon-locating Doppler radar system 16 such as the TPQ-36 or TPQ-37 scans a microwave energy beam 18 that covers a narrow instantaneous field-of-view (FOV) over a large field-of-regard (FOR) 22 to detect and then track incoming projectiles 14. A Doppler radar system analyzes how the frequency of the returned signal has been altered by the motion of the projectile. This variation gives direct and accurate measurements of the projectile's radial velocity relative to the radar system. Doppler radar can provide 3D position (e.g. coarse measurements of the Azimuth angle and Elevation angle and precise estimates range) of the target hardbody.

Once a stable track is established, the weapon-locating radar system follows the forward trajectory of the hardbody projectile 14 to measure a number of track points 24. The weapon-locating system assumes a ballistic trajectory and applies ballistic calculations to the track points 24 to backtrack along an estimated ballistic trajectory 25 to the Earth intercept to estimate a POO 26. The POO 26 is passed to a counterbattery 28 that computes a firing solution and directs counter-fire (e.g. a projectile 30) at the artillery piece 10 at the estimated POO.

Ideally the weapon-locating system would detect and track the projectile from the point the projectile is first observable by the radar system, i.e., the point the projectile emerges from behind the hill, dune or treeline 12 or if there is a clear line-of-sight, the point the projectile is fired from the artillery piece 10. In practice there is a delay, corresponding to many meters of distance travelled, before the system can detect the projectile and establish a stable track. Factors that contribute to this delay include a finite amount of time that it takes for the narrow FOV 20 of scanned beam 18 to cross the flight path of the projectile 14 and detect the hardbody of the projectile. The radar cross section of certain projectiles may be low enough that the projectile is not detected on the first pass. An additional scan or two may be required after initial detection to establish the stable track.

Doppler radar can provide a reasonably good estimate of the POO if the projectile is detected and tracked early enough in its flight trajectory, if the projectile does not boost or maneuver during any portion of the flight path (i.e. it does not depart from a pure ballistic trajectory) and if its flight path is not disturbed by high winds or unstable air. If these conditions are not met, the estimated POO will be less accurate, and the counterbattery fire will be less effective.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a weapon-locating ladar system that estimates a backward trajectory of an airborne target by using flow field measurements to follow the wake turbulence trailing the airborne target from the position at which the target is detected backwards towards the source of fire. The system may use the backward trajectory to estimate the point-of-origin of the target. The system may also use the flow field measurements along the backward trajectory to classify the target. Target classification may be used to refine the point-of-origin estimate, to influence counter-fire measures chosen, or to adapt the flow field measurements.

In an embodiment, a laser beam illuminates the wake trailing the airborne target from a position at which the target is detected backward until the wake is no longer observable by the weapon-locating ladar system. The laser beam has a spatial pattern and a temporal waveform selected to discriminate wake turbulence from naturally occurring atmospheric phenomena. The laser energy backscattered from molecules, aerosols and particulate matter in the volume of air in and around the wake trailing the airborne target is detected and processed to compute one or more atmospheric flow field images. Each image includes a profile of flow field measurements such as, but not limited to, spatially resolved radial velocity or derivatives in time or space, moments or functions thereof. The profiles of flow field measurements are processed to estimate a backward trajectory of the airborne target from the detected position of the target to the position at which the wake is no longer observable.

In an embodiment, the backward trajectory is projected backward past the position at which the wake is no longer observable to estimate a point-of-origin of the airborne target. In another embodiment, the flow field measurements are processed to extract a signature and assign a target class of the airborne target. The target classification may be used to refine the estimated POO (e.g. adjust the POO estimate or to resize an error box around the POO), to influence counter fire (e.g. type or amount of counter-fire), or to adapt the temporal waveform for the target class.

In an embodiment, the temporal waveform of the laser beam is adapted as the beam backtracks the wake from the detected position. As the wake ages, the flow field will change. The waveform may be adapted based on the "age" of the wake to preserve the quality of the flow field measurement, where "age" is used herein as a proxy for locations along the wake path measured back toward the point of origin. Alternately, the waveform may be adapted to make different flow field measurements.

In an embodiment, the ladar system adapts the temporal waveform for either a three-dimensional range-resolved mode or a two-dimensional angle/angle mode. The system illuminates the wake in the range-resolved mode from the detected position backwards until the wake is no longer observable in the range-resolved mode and then switches to the angle-angle mode until the wake is no longer observable. The system may progressively select less range resolution until there is only 2D information. In an embodiment in which a radar system provides the detected position and an estimated ballistic trajectory, the ladar system fuses the information from the radar and the 3D and 2D ladar to estimate the backward trajectory.

In an embodiment, in the three-dimensional range-resolved mode, the system processes the flow field measurements in Azimuth and Elevation angle at each range slice to estimate centers of the wake at each range slice. The system estimates a three-dimensional trajectory through the centers as the backward trajectory.

In an embodiment, in the two-dimensional angle/angle mode, the system, provided with an estimated ballistic trajectory, processes the flow field measurements in Azimuth and Elevation angle to estimate a sequence of wake centers and an angular locus. The system fits a curve through the wake centers to provide the Azimuth angle and Elevation angle components of the backtrack trajectory. The system maps the range coordinate of the estimated ballistic trajectory where the two-dimensional Azimuth angle and Elevation angle projection of the estimated ballistic trajectory is at the minimum angular separation from any point of the curve to provide the range component of the backward trajectory.

In an embodiment, the spatial sampling of the backscattered laser energy in the volume of air in and around the wake is adapted in accordance with the flow field measurements, target classification and ladar function.

In an embodiment, estimates of the wind velocity are extracted from the flow field measurements either inside or outside the wake as the wake turbulence is backtracked. The wind velocities are used to compensate the backward trajectory and POO estimate.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a-4c are diagrams of an embodiment of weapon-locating radar and ladar systems that detect an incoming airborne target and backtrack along the wake turbulence trailing the target to estimate a backward trajectory and POO to direct counter-fire;

FIGS. 6a and 6b are flow diagrams for an embodiment of a weapon-locating system including both radar and range-resolved and angle/angle ladar components;

DETAILED DESCRIPTION OF THE INVENTION

The present invention provides a weapon-locating ladar system that estimates a backward trajectory of an airborne target such as subsonic or supersonic projectiles, rockets, mortars, missiles, etc. by following laser energy backscatter from the wake turbulence trailing the airborne target from a position at which the target is detected backwards until the wake is no longer observable by the ladar system. The weapon-locating system may use the backward trajectory to estimate the POO of the target. The system may also use a signature of the wake along the backward trajectory to classify the target. The wake signature may be combined with a target signature provided by the ladar or a radar system to improve classification. Target classification may be used to refine the POO estimate or to influence counter-fire.

The use of ladar extends the direct measurement of the target hardbody trajectory back from the point of detection to the point the wake is no longer observable, which is much closer to the POO, thus improving the estimate of the trajectory and the POO. Given adequate persistence of wake turbulence, the weapon-locating ladar system can in theory track the wake back to the point that the target itself is first observable to the ladar system. A range-resolved ladar system is not limited to assuming ballistic trajectories and can accommodate boost or maneuvering to backtrack the trajectory to the POO. Furthermore, the ladar system can be used to measure a radial wind velocity along the extent of the target flight path to compensate the estimated backward trajectory. Angle/angle ladar can be used to push the point at which the wake becomes no longer observable further back towards the POO refining the estimated ballistic or non-ballistic trajectory provided during hand-off and/or generated by the range-resolved ladar.

Figure 1A:
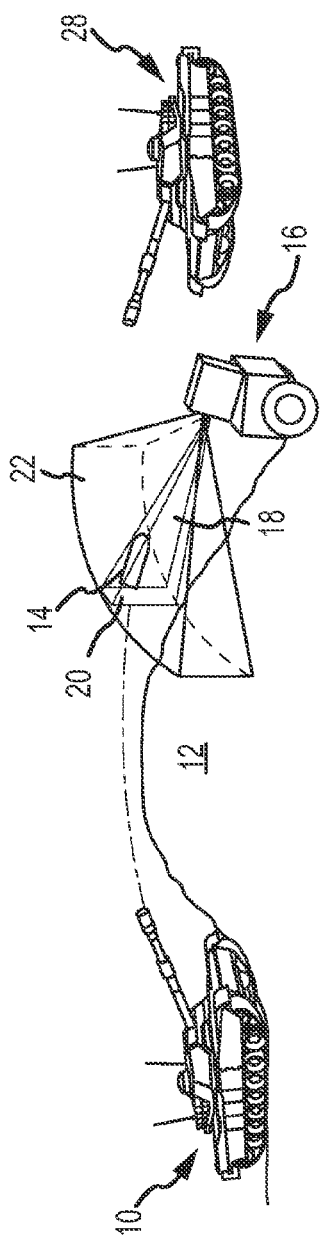
FIGS. 1a-1c, as described above, are diagrams illustrating the use of a known weapon-locating radar to detect and track an incoming projectile to estimate a ballistic trajectory back to the projectile's point-of-origin to direct counter fire.
Figure 1B:
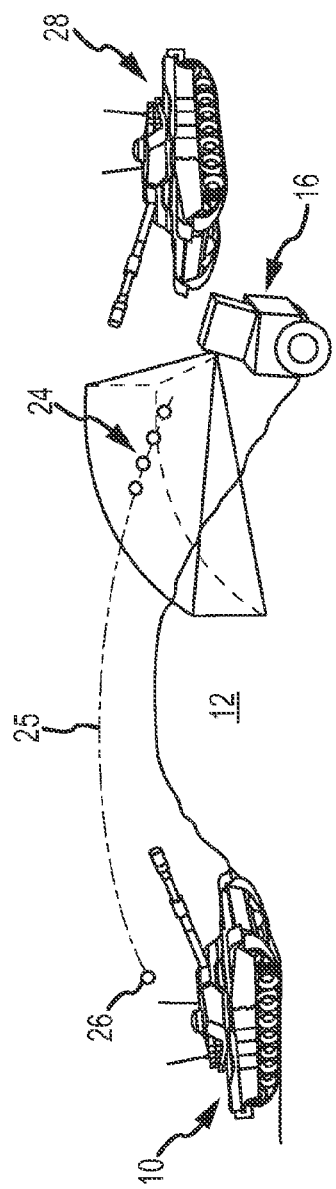
Figure 1C:
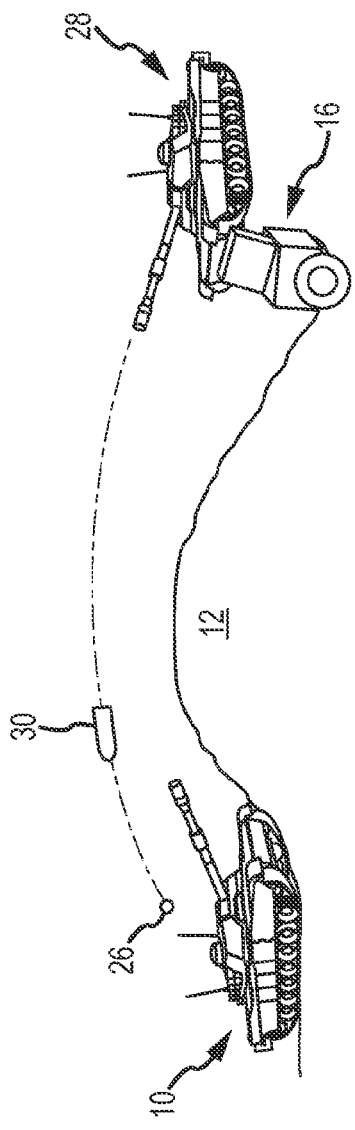
Figure 2:
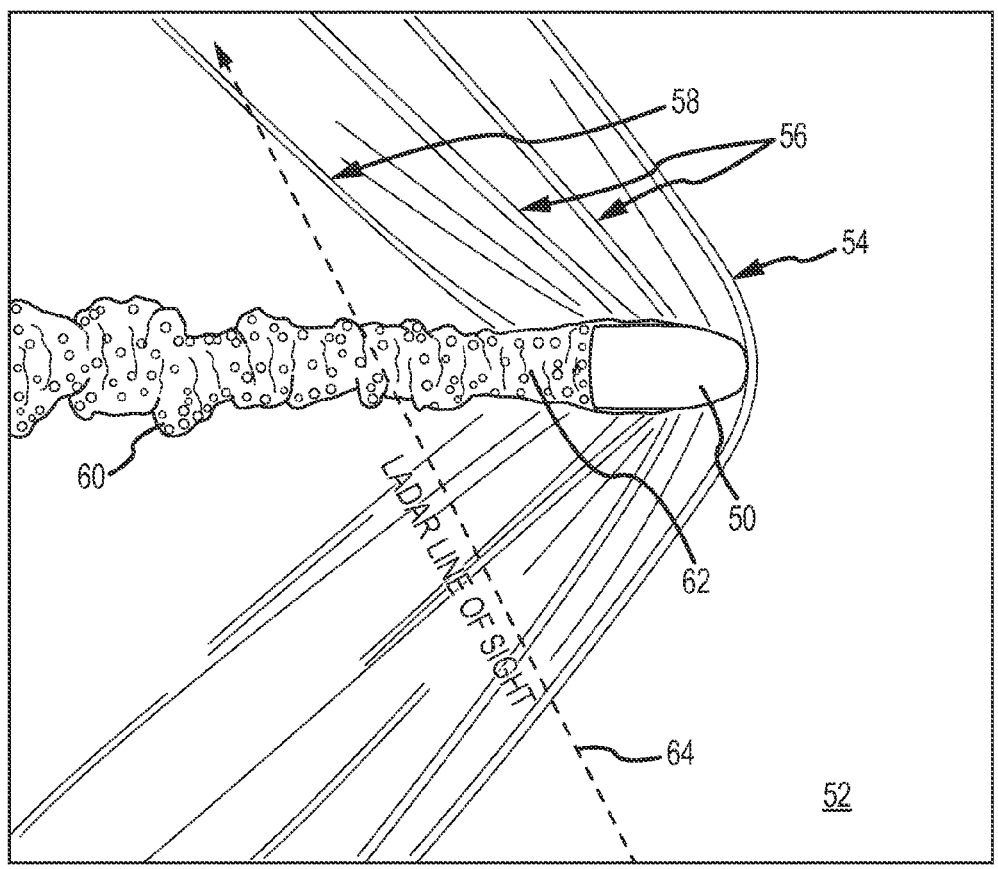
FIG. 2 is a shadow graph diagram of the turbulent wake and shock waves produced by a supersonic projectile moving through a fluid.

Referring now to FIG. 2, a supersonic projectile 50 moving through a fluid 52 such as air forms a leading acoustic bow shock wave 54, compression shock waves 56, expansion waves 58 and a turbulent wake 60 comprised of wake vortices

62. For subsonic projectiles, the shock waves 54, 56 and 58 radiating from the nose, body and trailing edge would vanish.

The leading acoustic bow shock wave 54 is formed by the tip of the projectile 50 compressing the fluid 52 through which it travels at a velocity greater than sound. The physical cone shape of the projectile tip determines the form of the curve of this shock wave at the tip of the projectile.

Due to the blunt form of the projectile several secondary compression waves 56 can be seen further along the length of the projectile profile. As the cross sectional area of the projectile increases from the tip towards the main body diameter, a volume of air is displaced and compressed. If there are any irregular surface changes to the smooth profile these will act as points from which the secondary compressions will occur. Each compression requires an equivalent expansion for equilibrium to be restored. A second principal compression shock wave can be seen trailing from the rear of the projectile. Two principal shock waves are characteristic of a projectile in supersonic flight. Conversely when the projectile body reduces in cross section expansion takes place as a volume of compressed air close to the surface is allowed to expand into the new volume created. Expansion waves cause the fluid flow to fan out. Expansion fans 58 can be seen near the rear corner of the bullet profile.

Turbulent wake 60 is created when the section of the projectile suddenly terminates in a square cut off at the rear of the profile. The controlled fluid flow over the surface of the projectile is suddenly tripped into a turbulent swirl and momentarily creates a sharp drop in pressure as the air flow velocity increases and then tries to suddenly return back to the surrounding pressure. The swirling flow of the wake vortices 62 will eventually recover after a series of compression and expansion phases and merge with the stable surrounding air flow. The phased pulse seen in this wake is due to the fluid in the wake progressively returning back to the energy state of normal surrounding fluid flow through a series of after shocks. Close observation of the swirl produced in the wake indicates that there is some fractal nature to the small turbulent swirls seen immediately behind the projectile and the progressive enlargement of the swirls developed later in the flow field. (Excerpted from waterrocket.explorer.free.fr/aerodynamics.htm)

Turbulent wake 60 may persist for several seconds (depending on wind and air conditions) after the passing of the projectile. The persistence of turbulent wake 60 means it will remain observable to ladar for some time. Depending on the nature of the wake and the wind conditions, the wake may remain observable to ladar back to the point the projectile itself is first observable from the radar system. The ladar may or may not have to switch from a range-resolved mode to an angle/angle mode to backtrack the wake to this point.

The wake vortices 62 shed from the trailing end of projectile 50 and its aerodynamic surfaces are basically regions of swirling molecules, aerosols and particulate matter, like whirlpools in water. These vortices can be characterized by their dynamic flow properties as well as possibly density and pressure. Dynamic flow properties of the vortices may be characterized by a spatially resolved radial velocity or derivatives in time or space, moments or functions thereof. A ladar system may be used to measure one or more of these characteristics of the turbulent wake to estimate the trajectory of the projectile from a position the target is detected backwards until the wake is no longer observable.

Furthermore, different classes of projectiles (e.g. size, speed, aerodynamic surfaces, boost, maneuverability, etc.) and possibly specific projectiles have unique wake signatures identifiable by one or more of the dynamic flow characteristics. Target classification may be used to alter the estimated backward trajectory to improve the POO estimate or error box, to control counter-fire or to control the ladar to better track the wake. Take for example a tactical rocket and assume that there is no wind nor is there any guidance after the rocket is launched. Such a rocket will follow a ballistic trajectory only after the boost motor has burned out. The size, speed and wake signature can aid in determining that the threat is a boosted rocket and may even be adequate to determine whether it is a particular class of tactical rocket. Each rocket has a certain mass and each booster has a certain thrust it imparts to the rocket over a specific period of time. This is sufficient information to significantly improve a ballistic calculation by adding in the booster's effect on the trajectory. Similarly, knowing that a laser guided projectile will not begin its maneuver until it reaches apogee is an important input to the ballistic calculation which would ignore much of the post-apogee track information and base a ballistic calculation on the pre-apogee portion of the flight path.

Figure 3A:
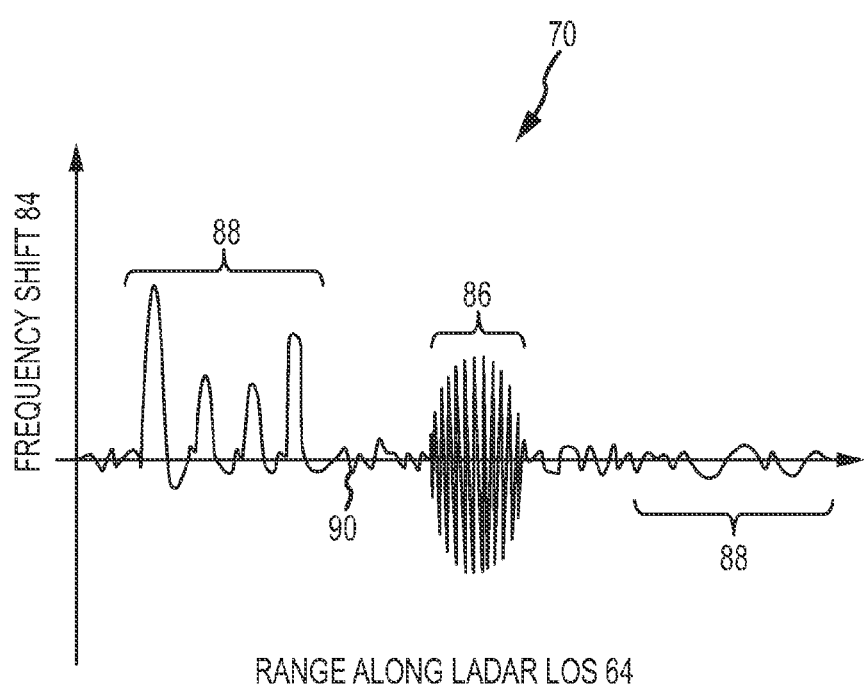
FIGS. 3a, 3b and 3c are, respectively, a plot of measured frequency shift versus range along ladar line-of-sight through the turbulent wake and range-resolved and angle/angle flow field images.
Figure 3B:
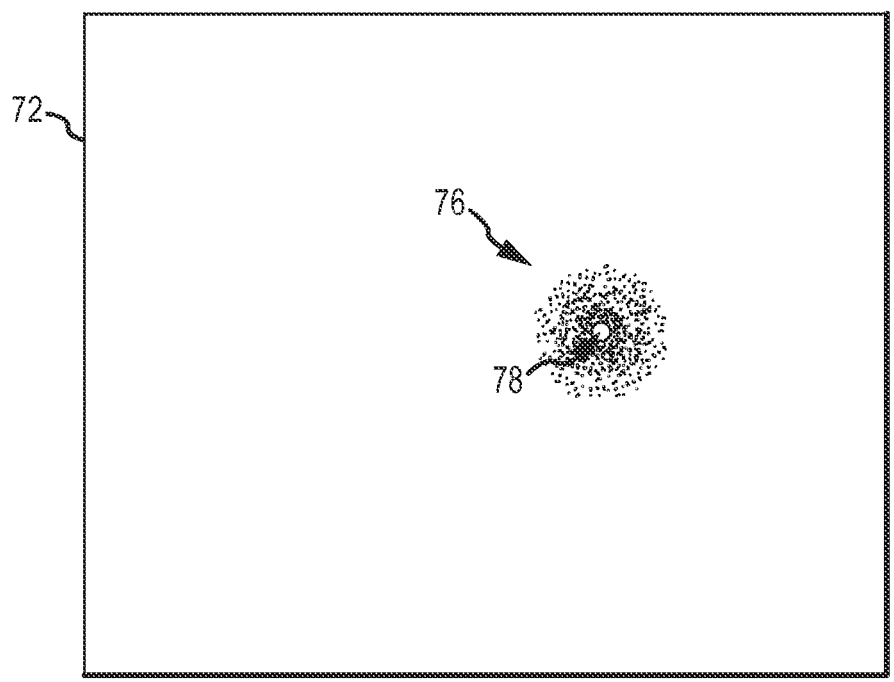
Figure 3C:
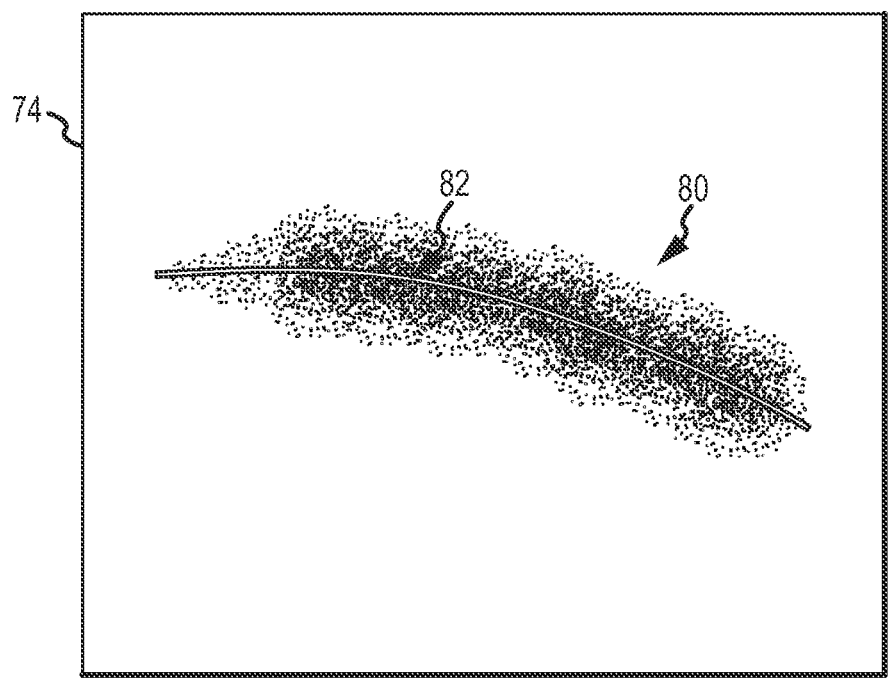

Referring now to FIGS. 3a-3c, a ladar system is used to illuminate turbulent wake 60 with a laser beam along a ladar line-of-sight 64 (FIG. 2) to detect and process the frequency-resolved laser energy 70 (FIG. 3a) backscattered from molecules, aerosols and particulate matter in the volume of air in and around the wake trailing the airborne target to compute a sequence of flow field images 72 (FIG. 3b for 3D range-resolved ladar) or a flow field image 74 (FIG. 3c for 2D angle/angle ladar) for a given FOV. The flow field images are spatially resolved in Azimuth angle and Elevation angle. Each image includes a spatially resolved profile of one or more flow field measurements. For range-resolved, the flow field measurements 76 may be processed to estimate a center 78 of the wake for each range slice. A trajectory through these centers provides an estimate of the backward trajectory. For angle-angle, the flow measurements 80, which resemble a summation of the flow field measurements of all of the range-resolved range slices into a single image, may be processed to estimate an angular locus 82 through the wake centers. A trajectory through these centers provides an estimate of the Az/El angle components of the backward trajectory. The range component is derived via reference to an estimated ballistic trajectory provided to the angle/angle algorithm.

As shown in FIG. 3a, in an embodiment the ladar system detects frequency-resolved laser energy 70 along the ladar LOS, which is represented as a frequency shift 84 versus range along the LOS 64. If near head-on with the projectile, a single FOV along the LOS may be sufficient to capture the entire trailing wake. More typically, the ladar LOS will be slewed to capture the entire trailing wake. Wake signature 86 is distinguishable from the shock wave signatures 88 on either side of the wake and the random signature 90 of the background atmosphere. The distinctiveness and persistence of the turbulent wake signature 86 presents an opportunity to detect and process the backscattered laser energy and backtrack the wake, hence path of the hardbody airborne target towards the point-of-origin of the target to provide a backward trajectory.

In a configuration, the ladar system detects frequency shift along the LOS. The measured radial velocity comes directly from the frequency shift according to: $v(radial) = c \cdot \Delta f_D / (2 \cdot f_L)$, where v is the radial velocity of the molecules/aerosols/particulate matters, c is the speed of light, $\Delta f_D$ is the measured shift in the laser frequency and $f_L$ is the laser frequency. This configuration is often referred to as a Doppler ladar and a Doppler shift. Doppler ladar is analogous to Doppler radar except the beam is laser energy instead of RF energy.

In a configuration, the ladar system detects frequency shift as a function of time along the LOS. Depending on convention this may or may not be considered a Doppler ladar. By measuring frequency shift "as a function of time", the system can directly measure or calculate the radial velocity plus a number of derivatives, moments or functions thereof to characterize the turbulent wake. The radial velocity is directly proportional to the frequency shift. The system may also calculate derivatives of velocity for acceleration (first derivative), jerk and snap. The system may compute various "moments" as a statistical ensemble of flow field measurements. For example, an average radial velocity would be a $1^{st}$ moment and a spread in radial velocity would be a $2^{nd}$ moment. The $2^{nd}$ moment may be used as a measure of circulation strength at each point in the wake. Other more complicated functions of dynamic flow such as rotational angular momentum, circulation strength, transient dissipation rates, and refractive turbulence strength may also be computed. The ladar waveform may be adapted as the turbulent wake is backtracked to optimize performance for a given flow field measurement or to make a different measurement.

To initiate backtracking of a turbulent wake trailing an airborne target, the weapon-locating ladar system is provided with an initial cue for the position of the hardbody of the airborne target. The cue includes at least the three-dimensional position (e.g. Az/El/range) of the hardbody at a detected position, typically the earliest detected position at which a stable track has been established. The cue may also include a time of the initial detection and velocity to allow the ladar system to acquire the airborne target hardbody at a point downrange from the initial detection and backtrack the turbulent wake from that point. The cue may also include an estimated ballistic trajectory based on the track points from the initial detected position forward. The initial cue will typically be provided by a weapon-locating Doppler radar system due to its superior capabilities to scan a large FOR to detect the airborne target hardbody and to provide accurate angle/angle/range position information. The weapon-locating radar system may be a tandem system with the weapon-locating ladar system or may be another asset in the theater of operations. Alternately, the cue might be provided by the weapon-locating ladar system itself or another ladar asset. The weapon-locating ladar system may be used on land, in the air or at sea.

Referring now to FIGS. 4a-4c, an embodiment of a weapon-locating system 100 for detecting and tracking an airborne target 102 and its turbulent wake 104 in order to estimate its POO 106 and direct counter-fire at the POO includes a weapon-locating radar system 108, a weapon-locating ladar system 110 and a counter-fire battery 112.

In a typical battlefield scenario an enemy artillery piece 114 hidden behind a hill, dune or treeline 116 fires an airborne target 102 at friendly forces. Airborne target 102 follows an actual trajectory 117 which may or may not be ballistic, from its POO 106. Deviations from a pure ballistic trajectory may be attributable to initial boost, late stage maneuvers or wind conditions.

Weapon-locating radars system 108 such as the TPQ-36 or TPQ-37 system scans a microwave energy beam 118 that covers a narrow instantaneous field-of-view (FOV) 120 over a large field-of-regard (FOR) 122 to detect and then track the hardbody of incoming airborne target 102. Initial detection of the airborne target will typically occur at a point along its trajectory 126 well after the airborne target becomes radar observable (e.g. emerges from behind the hill). Once a stable track is established, the radar system generates a cue that includes a detected position of the airborne target and possibly the time of detection and an airborne target velocity. The radar system may follow the forward trajectory of the hardbody airborne target 102 to measure a number of track points 124 to form an initial estimate of a ballistic trajectory that can be provided with the cue.

Ladar system 110 illuminates the wake 104 trailing the airborne target 102 with a laser beam 125 from a position 126 at which the target is detected backward until the wake is no longer observable by the ladar system. In an embodiment, the ladar re-acquires the airborne target 102 and begins to backtrack wake 104 from that point. The position at which the wake is no longer observable preferably corresponds to the position 128 at which the airborne target is first visible to the ladar system along its LOS 130. Wake dissipation or wind may cause the wake to lose observability before the ladar can backtrack the wake to that position. Typically, the ladar system will have to slew laser beam 125 to capture the wake 104 from the detected position 126 backwards until the wake is no longer observable.

The laser beam 125 has a spatial pattern and a temporal waveform selected to discriminate wake turbulence from naturally occurring atmospheric phenomena. The frequency-resolved laser energy backscattered from molecules, aerosols and particulate matter in the volume of air in and around the wake 104 trailing the airborne target is detected and processed to compute one or more atmospheric flow field images. Each image includes a profile of flow field measurements such as, but not limited to, spatially resolved radial velocity or derivatives in time or space, moments or functions thereof. The profiles of flow field measurements are processed to generate track points 132 through the wake 104 and to estimate a backward trajectory 134 of the airborne target through the track points 132 from the detected position of the target to the position at which the wake is no longer observable.

The ladar system projects the backward trajectory 134 backward past the position at which the wake is no longer observable to estimate the point-of-origin 106 of airborne target 102, hence the location of artillery piece 114. The POO 106 is passed to a counter-fire battery 112 that computes a firing solution and directs counter-fire (e.g. a projectile 136) at the artillery piece 114 at the estimated POO. The laser system may also project a forward trajectory 138 to estimate a point-of-impact 140 of airborne target 102. The ladar system may process the flow field measurements to extract a wake signature to assign a target class of the airborne target. The target classification may be used to refine the estimated POO (e.g. adjust the POO estimate or to resize an error box around the POO), to influence counter fire (e.g. type or amount of counter-fire), or to adapt the temporal waveform for the target class. The ladar system may combine the wake signature with the airborne target hardbody signature provided by the radar or ladar system to improve classification.

In an embodiment, the ladar system adapts the temporal waveform of laser beam 125 for either a three-dimensional (3D) range-resolved mode or a two-dimensional (2D) angle/angle mode. The system illuminates the wake 104 in the range-resolved mode from the detected position 126 backwards until the wake is no longer observable in the range-resolved mode and then switches to the angle-angle mode until the wake is no longer observable. The ladar system fuses the information from the radar and the 3D and 2D ladar to estimate the backward trajectory.

In an embodiment, the ladar system adapts the temporal waveform of the laser beam 125 as the beam backtracks the wake 104 from the detected position 126. As the wake ages, the flow field will change. The waveform may be adapted based on the age of the wake to preserve the quality of the flow field measurement. For example, as the wake ages, velocity excursions from the mean Lagrangian field will be reduced, circulation strength will be reduced, and the spatial scale of the wake may expand. Thus, as the wake ages, the transceiver may offer better performance by producing a longer temporal laser pulse width, which will average over a larger volume of the atmosphere, and provide better velocity resolution. The better velocity resolution obtains as a result of the spectral transform limit of the longer pulse width being narrower and leads to a lower velocity noise floor and better velocity resolution. Alternately, the waveform may be adapted to make different flow field measurements.

In an embodiment, the ladar unit's transceiver may adapt the spatial sampling of the backscattered laser energy in the volume of air in and around the wake in accordance with the flow field measurements, target classification and ladar function. The transceiver can either be single spatial sample [more precisely an angle-angle extent sample that is diffraction limited for coherent ladar but not necessarily diffraction limited for direct detection ladar] or multiple spatial samples, depending on cost and complexity trades for the intended application. In the case of a single spatial beam transceiver, the beam scanning pattern may be adapted in real time to optimize the transceiver efficiency for functions such as, but not limited to: handover from the radar; locating the highly turbulent core of the wake; or looking for characteristic atmospheric ring flow structures; all in the interest of saving time and power while increasing trajectory state estimator accuracy. In the case of multiple spatial beam atmospheric sampling configurations, the projected beams and subsequently detected backscatter from atmosphere can be adjacent to one another with a 100% fill factor or sparsely configured for a fill factor of <100%. The multi-beam patterns may be selected in a variety of different geometries such as but not limited to: lines, arcs, circles, disks, and sparse regular/irregular grids. The choice of the spatial sampling geometry will be driven by the target type and function, such as search, characterize, track, and can be manually or automatically selected.

In an embodiment, the ladar system may extract estimates of the wind velocity from the flow field measurements either inside or outside the wake as the wake turbulence is backtracked. For example, the average radial velocity inside the wake is an estimate of the radial wind velocity. The ladar system may use the wind velocities to compensate the backward trajectory and POO estimate.

Figure 5:
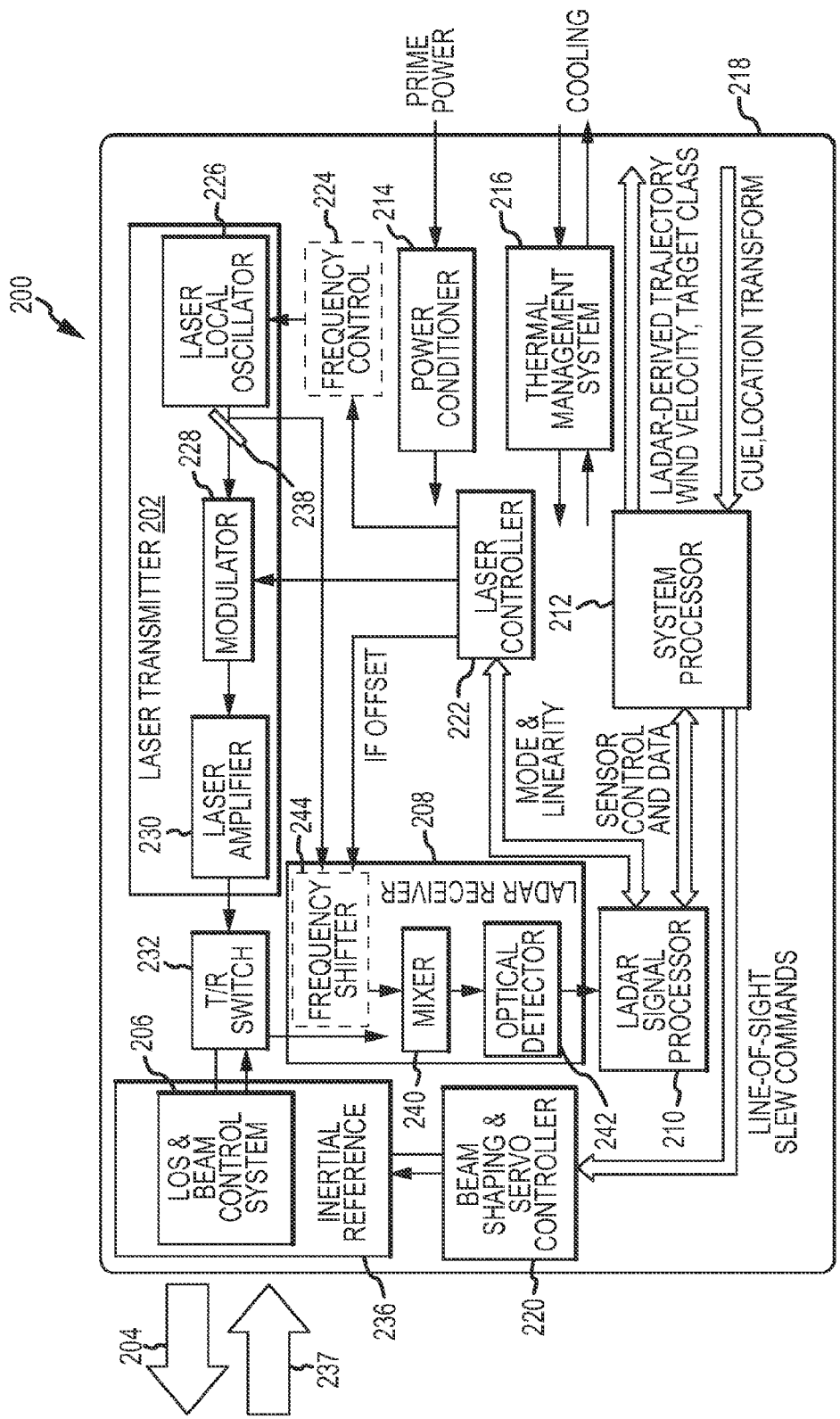
FIG. 5 is a block diagram of an embodiment of a weapon-locating ladar system for detecting the airborne target and backtracking along the wake turbulence trailing the target to estimate the trajectory.
Figure 6B:
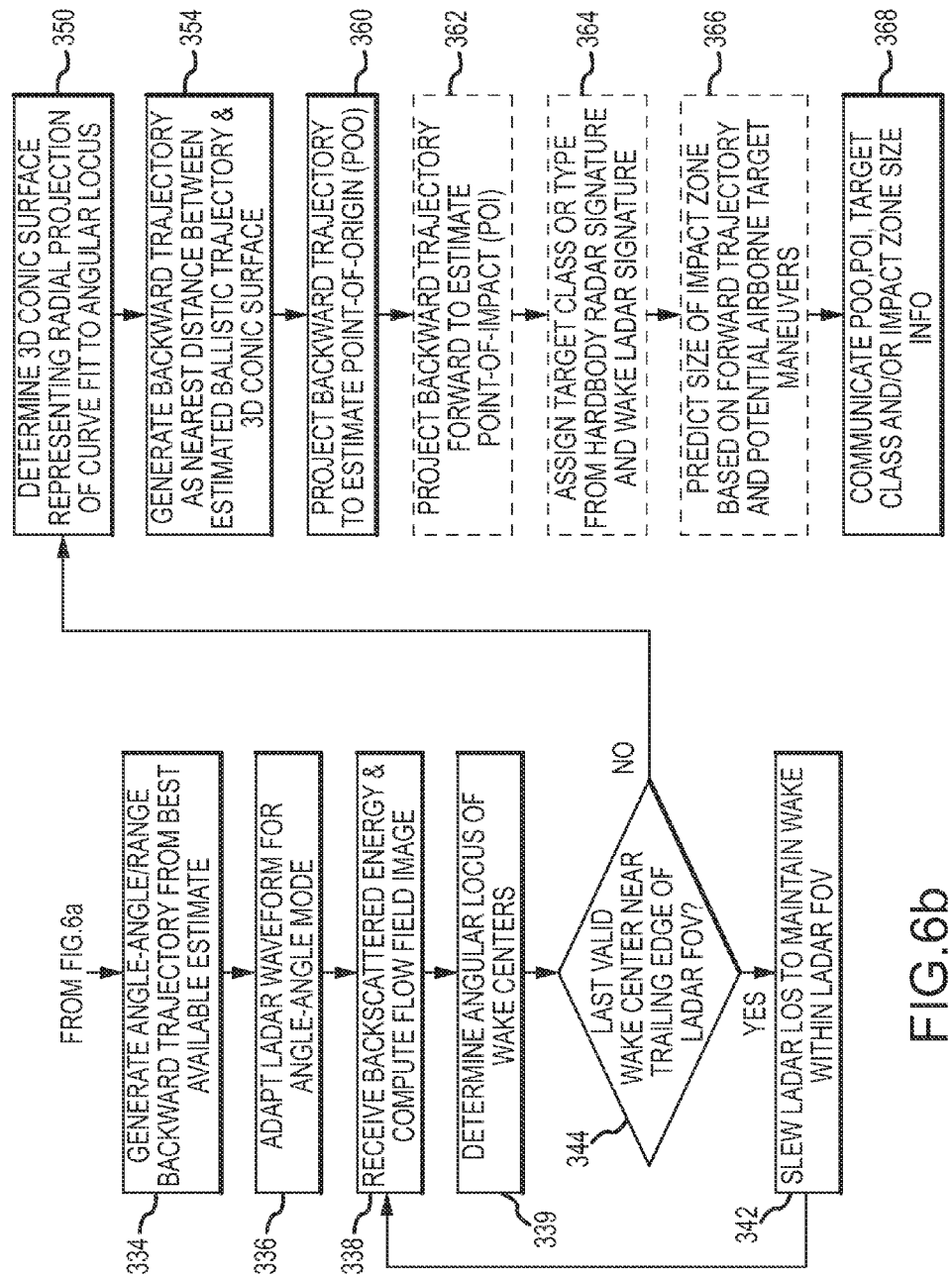
Figure 7:
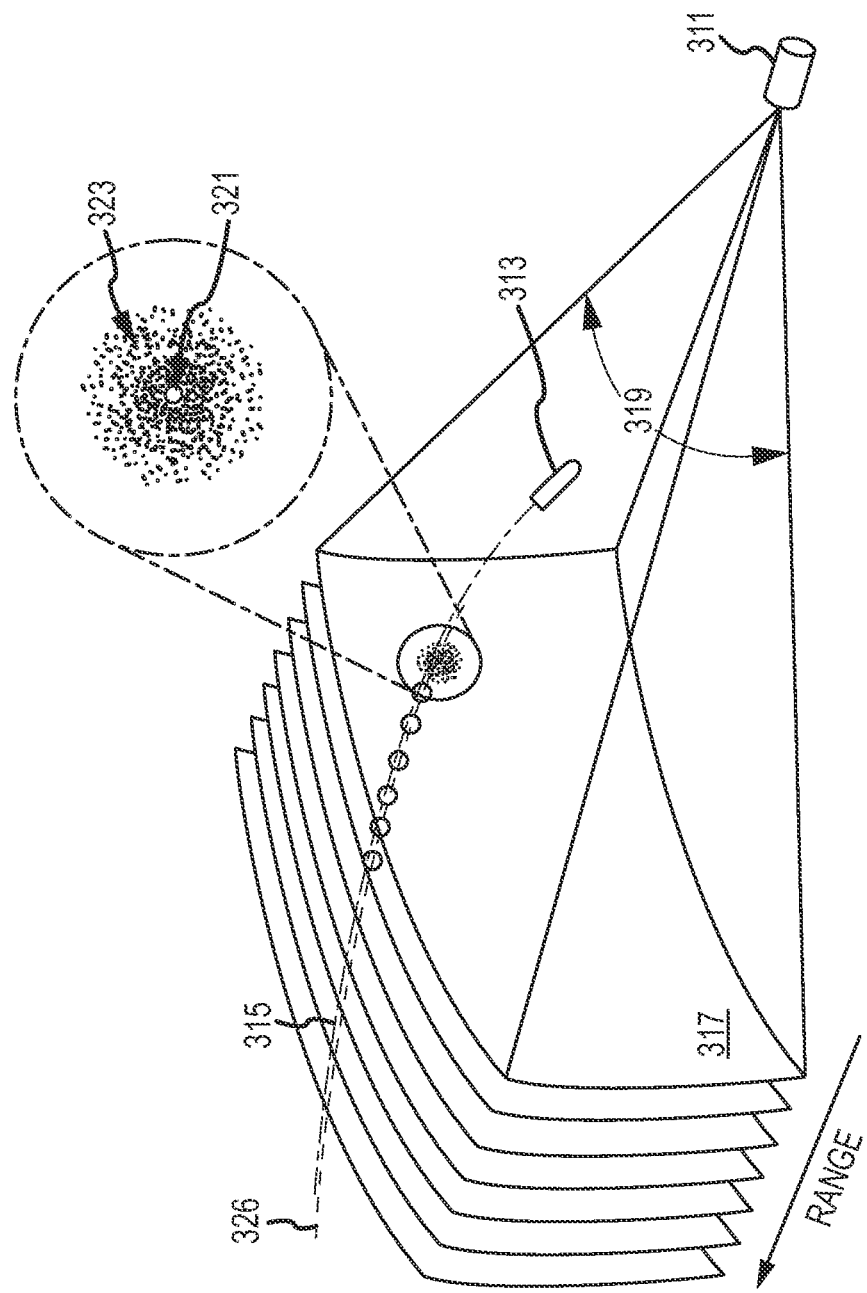
FIG. 7 is a diagram of an embodiment for using three-dimensional range-resolved ladar to estimate the backward trajectory.

Referring now to FIG. 5, an embodiment of a weapon-locating ladar system 200 comprises a laser transmitter 202 that generates a laser beam 204, a LOS and beam control system 206 that shape the spatial pattern of laser beam 204 and points the beam at the airborne target or its trailing wake, a ladar receiver 208 that detects frequency resolved laser energy backscattered from molecules, aerosols and particulate matter in the volume of air in and around the wake trailing the airborne target, a ladar signal processor 210 that processes the detected laser energy to compute one or more atmospheric flow field images, each said image including a profile of one or more flow field measurements, and a system processor 212 that processes the profiles of flow field measurements to estimate a backward trajectory of the airborne target from the detected position of the target to the position at which the wake is no longer observable, estimate a POO, estimate a POI or classify the target as well as performing other system level functions. A power conditioner 214 receives power and provides the conditioned power sources required by various system components. A thermal management system 216 provides cooling for the laser transmitter, receiver, LOS & beam control system, the plural processors, and power conditioner.

The weapon-locating ladar system will typically receive a cue signal 218 from a weapon-locating radar system, such as the AN/TPQ-37 Firefinder system, that a threat airborne target (e.g., ballistic ordnance, laser guided projectile, unguided rocket, guided missile) has been detected. Alternatively, it could be cued by ground based electro-optical infrared search and track systems, which are increasingly used for area air defense and counter-fire applications. Telescope aperture sharing of the active ladar sensor with the passive infrared sensors is possible. The system will also receive radar/ladar sensor location transform information.

Once the weapon-locating radar system or other cueing system has developed a track, it will typically transmit state vector information about the hardbody, including its 3D position and velocity. Once sufficient track information is acquired to calculate a presumed ballistic trajectory, that information is transmitted to the weapon-locating ladar system.

Upon receipt of a cue from the weapon-locating radar system, the system processor 212 predicts the future angular location of the threat airborne target as a function of time, based on the 3-D position and velocity measured by the weapon-locating radar system at a given moment in time (e.g., GPS or IRIG-B time tag), thereby correcting for time latency and corresponding angular shift between the last radar update and re-acquisition by the weapon-locating ladar system. At this point, the system processor converts the target location coordinates received from the weapon-locating radar system (e.g., compass bearing and elevation angle relative to horizon measured at the Radar location) to ladar beam control pointing angles in the ladar reference frame. It then sends these pointing angles to the ladar beam shaping & servo controller 220 with the command to slew the sensor line-of-sight in a time optimal fashion to those pointing angles and then stabilize the line-of-sight against base motion disturbances.

The ladar transmitter 202 is activated via a mode command from the ladar signal processor 210 to a laser controller 222, which, in turn, activates frequency control 224 and a laser local oscillator (LO) 226 and commands a modulator 228 to frequency modulate the optical output of the LO with a waveform suitable for effectively re-acquisition and tracking of the airborne target hardbody, or wake detection, as appropriate. In this embodiment, the output of the modulator is amplified by a separate high-gain laser amplifier 230. An alternative is to use the local oscillator to injection seed/lock a slave oscillator for high peak power waveforms such as polypulse coherent waveforms. In general, any of the many temporal waveforms that are suitable for atmospheric velocity flow measurements can be utilized. They may have time bandwidth products ranging from nearly equal to 1 for spectral transform limited measurement capability to time bandwidth products >1 that may be more efficient in some measurement scenarios.

The laser beam 204 may be a single or multiple beams. Multiple beams may in some circumstances, be used to measure a transverse velocity. The laser beam has a wavelength in the UV to LWIR spectral range with human eye-safe wavelengths in the SWIR >1.4 microns being typical. Laser beam 204 may be a pulsed or continuous wave beam. If used, frequency modulation will ideally be adaptable to change the range resolution and Doppler resolution. In some cases for hardbody detection, the pulse width (conversely the spectral bandwidth for range compression) will need to be short, say 10 ns/44 MHz transform limited bandwidth, and in other cases, for looking at spatially larger, lower velocity plumes, pulses of 100's of nanoseconds (4.4 MHz or less spectral bandwidth) will be needed to measure wind velocities with resolutions of 1 m/s. An embodiment provides range-resolved Doppler information and may use a coherent linear FM chirp or poly pulse coherent waveform to provide both Doppler and range. Certain range-resolved Doppler sensing waveforms are known in the art (e.g., Halmos, U.S. Pat. No. 6,972,400, "Multi-mode Vibration Sensor Laser;" Halmos, U.S. Pat. No. 6,875,978. "Modelocked Waveform for Synthetic Aperture Ladar;" and Halmos U.S. Pat. No. 7,505,488, "Synthetic Aperture Ladar with Chirped Modelocked Waveform"). These embodiments are capable of operating in an angle/angle mode when the capability to resolve range degrades. Other embodiments may provide only Angle/Angle measurement capability. Thus, the outgoing laser waveforms and/or the signal processing of the echoes can be modified to select range and velocity resolution that best serve the reconstruction of the hard target or the atmospheric flow field for trajectory backtracking. The flexibility allows the track algorithms to move from 3D flow field imaging to 2D angle-angle imaging as the signal to noise ratio permits and as the tracking algorithms require.

The outgoing laser beam 204 is sent through a transmit/receive (T/R) switch 232 to share an aperture with the receiver 208 in a "monostatic" configuration. Alternately, the laser beam the outgoing laser beam and incoming backscattered laser energy may be sent to separate laser telescope aperture(s) in a "bi/multistatic" configuration that has no T/R switch and are only used to transmit the laser beam.

The outgoing beam is directed to LOS & beam control system 206 to point the beam towards the target through the intervening atmosphere. The outgoing laser beam is expanded to optimally fill the output telescope aperture and projected towards the target. If it is a single pixel coherent detection transceiver, the outgoing laser beam will ideally be diffraction limited in angular extent. Alternatively the transmitted beam could be shaped into a non-diffraction limited Gaussian transverse intensity profile for a multiple pixel receiver, or non-Gaussian rectangular/square profile flood beam, flat sheets of light, a sparsely sampled spot array, or other illumination geometries best suited to wake/hardbody tracking.

Inner and outer gimbals are suitably used to provide LOS control. There are multiple alternatives and variations to the inner/outer gimbals include but are not limited to: bi/multistatic aperture configurations (separate transmit and receive apertures) in heliostats, coelostats, and gimbaled telescope mounts. In the monostatic and biimultistatic aperture configurations, there are alternative beam control technologies including but not limited to: programmable optical phased arrays, Risley prisms, holographic optical elements that are staged/rotated, and polarization based diffraction gratings.

Associated with the beam control system is a six-degree of freedom (6-DOF) inertial reference 236 that facilitates handoff from the radar system to the ladar system line of sight control, and is connected to a geolocation reference to provide the incoming fire point of origin prediction. The inertial reference can be provided as either a common opto-mechanical "strapdown" reference or alternatively through an optical datum transfer, pilot laser alignment beams, autocollimators, extended prism retroreflectors and others. The handoff volume from the radar is then searched by a variety of adaptive means such as conical, fence or random scans until the desired signals are retrieved and backtracking is deemed effective.

Laser energy 237 is backscattered off the target hardbody and or the atmospheric aerosols, molecules and particulate matter in the wake and returned through the atmosphere and the LOS & beam control system 206. The return energy travels a different path than the transmitted laser through the T/R Switch 232 (which may be a polarization beamsplitter, spatially separate aperture, or other means) or alternatively through a separated receive aperture.

In a coherent detection ladar receiver 208, a beamsplitter 238 extracts a portion of the local oscillator beam and a mixer 240 optically mixes the portion of the local oscillator beam with the backscattered energy to create a heterodyne beat signal. Typically, the ladar receiver uses a "square-law" detector 242 that demodulates the optically mixed signal to, for example, measure frequency shift as a function of time. Ladar signal processor 210 processes the demodulated signal to compute the one or more flow field images to extract information such as target range and frequency shift (range-resolved images). Alternatives to the single pixel heterodyne receiver are: multiple pixel coherent ladar receivers for spatial resolving vortex/wake structure, for improving the quality of the track file and/or reducing search times; coherent double balanced receivers; images of the atmospheric speckle pattern to measure cross-winds; homodyne and autodyne receivers to reduce the temporal bandwidth of the receiver and in some configurations measure the acceleration vs. the Doppler shift. Alternatives to the optical wave mixing coherent receivers with local oscillators are direct detection high spectral resolution ladar (HSRL) Doppler receivers that measure spectral shifts and widths with a variety of interferometric Doppler retrieval techniques well known in the field.

Because the target is moving relative to the ladar transceiver, there will be a frequency shift in the return signal due to this relative motion. This frequency shift may vary over a wide range of values depending on the speed of the airborne target and viewing angle, so it may be advantageous to shift the frequency of the LO signal in a frequency shifter 244 in response to the measured frequency shift in order to center it on a given intermediate frequency to simplify signal processing. Alternatively, in direct detection receivers, the servo that tracks the middle of the free spectral range of the spectral interferometer can be shifted to simplify signal processing and enhance the dynamic range or the receiver.

There are multiple methods for establishing a ladar active track depending upon the mission needs and scenario. In one the hardbody backscattered energy is acquired through handoff information from the cue sensor and subsequent ladar search with a conical or other type of spatial pattern. The number of pixels in the receiver and the projected beam pattern (possible <100% sampling geometry) will influence the search process. Once the wake vortices behind the airborne target are detected, the system processor 212 commands the beam shaping & servo controller 220 to slew in the opposite direction of the airborne target trajectory in order to initiate backtrack along the wake vortex trail. The ladar information is used to map the physical extent of the wake from the trailing edge of the airborne target to the point where the wake vortex signature is no longer observable, which may be the point at which the airborne target emerged from a treeline or from behind a terrain feature such as a hill. The system processor 212 estimates a central path through the wake volume and, from this, predicts the complete trajectory of the airborne target from its point of origin. The forensic wake back track algorithms and searches can be achieved by a variety of methods such as Kalman filters, particle filters, maximum likelihood filters, and other techniques. Information on wake dissipation and wake spatial extent growth in the prevailing winds and atmospheric convection/advection will be collected by the ladar and used in reconstructing the wake path back. The back track would be completed in as short a time as the power-aperture product of the ladar permits before moving to another incoming airborne target in a salvo. Alternatively, there could be multiple beam control systems and multiple ladar transceivers set up to assist the cue sensor to track multiple airborne target and/or enhance the speed and accuracy of the single airborne target back track.

The weapon-locating ladar system is also capable of measuring wind speed and direction that may be used by the system processor 212 to better predict the actual airborne target trajectory, since the wake vortices travel with the local wind. The laser line of sight radial component of the wind may be calculated directly from the Doppler signature of the wake vortices. If there is no radial component to the wind velocity, the statistical distribution of the Doppler shift will have a mean value of zero velocity averaged over the full spatial extent of the wake. Any significant deviation from this is a measure of radial wind velocity. Alternatively, the radial wind velocity can be measured as the Doppler shift in the return from the undisturbed air near the wake. Taking Doppler measurements at different angular offsets from the wake measurement will allow different vector components of wind velocity to be calculated as well, yielding a complete measure of the wind velocity vector near the wake. Using weapon-locating ladar emplacements at different locations along the anticipated incoming fire trajectories will allow better 3D wind field and vortex shedding reconstruction. Another approach to 3D wind field retrieval is to use the weapon-locating ladar system to measure temporal correlations of the range-resolved and spatially resolved speckle/Doppler spatial structure in a multi-pixel ladar or potentially, a fast scan few pixel receiver. The temporal correlation functions of the spatially structured backscattered light can be used to inferentially measure cross-winds assuming the Taylor frozen turbulence hypothesis for advecting the wake within the laser probe volume. Full 3D versus line of sight only (radial from the sensor) wind velocity retrieval is a matter of a cost-capability system trade and may be unnecessary for some mission scenarios.

Alternatively, the weapon-locating ladar system could initiate a limited search mode based on a priori information of likely hostile artillery locations and corresponding airborne target trajectories in the tactical battlespace. This would not be a preferred mode, given the typically narrower field-of-regard provided by the ladar sensor relative to a typical weapon-locating radar system, however, under some circumstances where other information is known about the opposing force (e.g., intelligence on enemy artillery emplacements, optimal directions of fire, terrain constraints, etc.), this self-cueing mode may be effective. In this mode, the weapon-locating ladar system would enter a track mode immediately upon hardbody detection or wake detection through a ladar fence.

Due to parameter drift in some of the modulator, ladar receiver, and analog ladar signal processor components over time and temperature, the ladar signal processing may be sub-optimal. A linear FM (chirp) waveform, for example, can become non-linear due to parameter drift, thereby resulting in enhanced sidelobes when the pulse is compressed in the signal processor. One approach to improving linearity under these conditions is to pre-warp the transmitted waveform in order to correct or compensate the non-linearities, thus ensuring improved spectral sidelobe rejection. A linear-FM pre-warp approach is taught in US Patent Application No. 20110299849, entitled "Method and Apparatus for Synthesizing and Correcting Phase Distortions in Ultra-wide Bandwidth Optical Waveforms." Linear FM waveforms also have limitations for rotating target speckle decorrelation times complicating the signal processing, reducing the SNR and range compression efficacy, so alternative waveforms such as step-tone, tone burst, and random frequency step pulses may be used.

Once a stable track is achieved on the airborne target hardbody, the system processor 212 may command the ladar signal processor 210 to change the modulation format to better detect and track the Doppler signature associated with the wake vortices shed by the trailing edge of the airborne target and aerodynamic surfaces. In this mode, the ladar detects the return from the laser beam scattered from aerosol droplets (condensed water) and/or particulates (e.g., dust, battlefield smoke, and/or rocket exhaust) and/or molecules that are entrained in the vortices. Different waveforms and signal processing algorithms may be used to accomplish this, based on age or quality of the wake, flow field measurements to be made, an estimate of the threat class or limited trial and error. The waveform and signal processing algorithms may be initially adapted for a range-resolved mode for the younger and more vigorous portions of the wake and adapted for an angle-angle mode as the wake ages. Within each of these modes, the waveform and signal processing algorithms may be adapted to optimize the flow field measurements.

In one embodiment, a waveform may be tailored to sense the spread in Doppler frequency attributable to the wake vortex over a sensing volume equivalent to the physical dimensions of the average vortex size for a known class of airborne target. If the measured Doppler data reveals a different spread in frequency and/or a different physical extent of the wake vortex, or if it reveals the signature of a vortex shed from the control surfaces of a maneuvering missile, the system processor 212 may command the ladar signal processor to switch to a more effective modulation waveform and processing modality such as a short spectral transform limited pulse.

Knowledge of the characteristics of the vortices shed in the immediate vicinity of the airborne target hardbody, in addition to the state vector and physical size of the airborne target provides useful information about the class and even the type of airborne target that may improve the trajectory estimate for a counter-fire solution. For example, the physical dimensions (length & diameter) as measured by the ladar during hardbody track along with velocity information may indicate that the airborne target is of the class of boosted tactical rockets. Threats of this class are known to follow a non-ballistic trajectory during the initial phase of flight when the rocket motor is still firing. This information can be used calculate the unobserved portion of the trajectory more accurately and, therefore, better predict the point of origin for counter-fire artillery. Knowledge of the target class and/or type may also be communicated to battlefield commanders as an aid to understanding the tactical situation and the danger to friendly forces and high value assets posed by enemy rocket, artillery, and mortar fire. Knowledge of the target class may also be used to adapt the waveform to more efficiently extract the flow field measurements more appropriate for that target class.

Referring now to FIGS. 6a-6b, 7 and 8a-8b, an embodiment is described for fusing hardbody trajectory estimates from a weapon-locating radar system with 3D range-resolved and 2D angle-angle wake trajectory estimates from a weapon-locating ladar system to estimate the trajectory of an airborne target. The weapon-locating ladar system initializes a mode (step 300) to track a wake vortex, establishes coordinate transformation parameters for handover from the weapon-locating radar system location and orientation to the weapon-locating ladar system location and orientation (step 302) and establishes data transfer protocols between the radar and ladar systems (step 304). The weapon-locating ladar system periodically runs a Built In Test (BIT) (step 306) until receiving a cue from the radar system that an airborne target has been detected (step 308). The radar system tracks the airborne target hardbody (step 310) and hands off a track state vector to the ladar system (step 312). The ladar system slews the LOS of ladar transceiver 311 to the predicted LOS of the airborne target 313 as the target follows its true airborne trajectory 315 (step 314) and activates the ladar transmitter and track of the airborne target wake (step 316).

The ladar system adapts the ladar waveform for a 3D range-resolved mode (step 318) and initiates processing of the received frequency-resolved backscattered energy to compute flow field images 317 at different range slices (step 320) for the current FOV 319. The system may further adapt the ladar waveform to optimize or change the flow field measurements as the wake is backtracked. In each range slice, the ladar system estimates a center 321 of the wake from flow field measurements 323 (step 322). The wake center 321 may be estimated in a variety of ways. One of the flow field measurements 323 may be a circulation strength derived from the radial velocity profile. The angular position (e.g. Az/El) of a peak circulation strength is one estimate of the wake center. Another approach would be to determine the physical extent of the wake by, for example, threshold the flow field measurement of radial velocity or circulation and determining a geometric center of the physical extent. The ladar system may determine a range-resolved radial wind speed either directly from the flow field measurements of the wake (e.g. average radial velocity) or from flow field measurements outside the wake (step 324). The ladar system estimates a target trajectory 326 through the wake centers in the current (and any previously tracked FOV) (step 331). The ladar system slews the ladar LOS to maintain the wake within the ladar FOV (step 330).

The ladar system continues to slew the ladar LOS and receive and process the backscattered energy to estimate the wake centers to backtrack the wake until the wake is no longer observable. In general, the wake is no longer observable when a wake signature cannot be discerned from the detected energy and flow field measurements. The wake may be observable in all, some or none of the current FOV. The ladar system can determine if the wake is no longer observable and, if so, where it is in the current FOV in a variety of ways. In this embodiment, at some point in the loop the ladar system processor determines the position of the last valid center of wake estimate and determines whether it is near an edge of the ladar FOV (step 332). If yes, the system slews the LOS (step 330) and continues. If no, the system exits the range-resolved mode. The position of the last valid wake center estimate may be determined from the flow field measurements upon which the wake center estimate is made (e.g. is there evidence of turbulent flow?), from different flow field measurements that produce a wake signature or from the target trajectory through the wake centers (e.g. at what point does the trajectory become noise) or another metric that estimates the systems ability to resolve range.

In a typical ladar system, the capability to resolve range may be degraded before the capability to resolve angle/angle measurements. Consequently, a wake that is no longer observable in range-resolved mode may continue to be observable for some time and distance backward along the wake trail in angle/angle mode. The system may progressively reduce the range resolution before switching to angle/angle mode. The ladar system generates an estimate 333 of the angle/angle/range trajectory from the best available estimate from either the Radar tracked provided at hand-off, the range-resolved ladar or a fusion thereof (step 334) and adapts the ladar waveform for angle-angle mode (step 336). The system may further adapt the ladar waveform to optimize or change the flow field measurements as the wake is back-tracked.

The ladar transceiver 311 receives the backscattered energy for the current FOV 319 and computes a single flow field image (of the type shown in FIG. 3c) for the current flow field (step 338). The ladar system processes the flow field image to determine an angular locus of wake centers (step 339). In an embodiment, the system takes vertical slices of the image and selects the peak circulation strength (e.g. the $2^{nd}$ moment of the radial velocity profile) as the wake center to form the angular locus. The system fits a curve 340 through the angular locus using standard regression or trajectory projection techniques. Curve 340 provides the azimuth and elevation angle components of the estimated backtrack trajectory. Curve 340 is shown with the angle/angle projection 341 of the 3D estimate of the ballistic trajectory 333 in FIG. 8a. As before, the ladar system slews the ladar LOS to maintain the wake within the ladar FOV (step 342) until the wake is no longer observable to the angle-angle processing. As before, wake observability may be determined by testing whether the last valid wake center (e.g. angular locus point) is near an edge of the ladar FOV (step 344). If yes, the system slews the ladar FOV and continues to process received energy. If no, the system has tracked the wake as far back as it can be tracked.

To assign the range component to the angle-angle derived 3D target trajectory 346, the ladar system determines a 3D conic surface 348 representing the radial projection of curve 340 (step 350). Line segments 352 denote the nearest distance between conic surface 348 and the estimated ballistic trajectory 333. Line segment $\overline{PQ}$ is one such line segment 352 shown in the angle/angle projection of FIG. 8a and the 3D view of FIG. 8b. The ladar system associates the range component at point Q of estimated ballistic trajectory 341 with angle/angle component at point P of curve 340 to provide angle/angle/range coordinates of 3D target trajectory 346 (step 354). A rigorous presentation is presented in Appendix A.

The ladar system may compute various outputs from the backward trajectory 346 derived from measurements of the turbulent wake trailing the airborne target. The system projects the backward trajectory past the position at which the wake is no longer observable to estimate a point-of-origin (POO) of the airborne target (step 360). Similarly, the system may project the backward trajectory forward to estimate a point-of-impact (POI) (step 362). The system may assign a target class or type to the airborne target from the hardbody radar signature and/or the wake ladar signature (step 364). The wake ladar signature may use the same or different flow field measurements used to locate the wake centers and estimate trajectory. The assigned target class may be used refine the POO or POI estimates, to modify "error boxes" around each, to adapt the range-resolved or angle/angle waveforms or to affect the counter fire directed at the point of origin. Target classification can provide information as to the nature of the threat and the type and amount of counter-fire required to neutralize the threat. The system may predict the impact zone about the POI (i.e. the error box) based on the forward projection of the trajectory and potential target maneuvers based on the classification (step 366). The ladar system communicates the various outputs directed to a counter-fire battery, to a command and control center or back to the Radar system for distribution (step 368).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

APPENDIX A

Figure 8A:
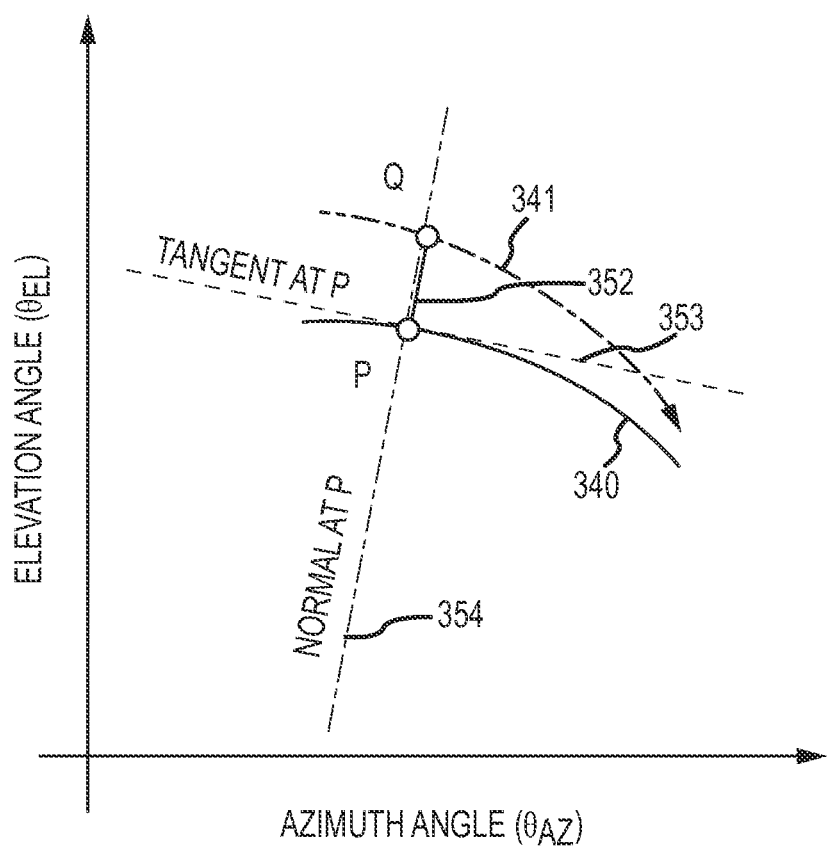
FIGS. 8a and 8b are respectively an angle/angle plot of trajectory and a projection into three-dimensional space of an embodiment for using angle/angle ladar to estimate the backward trajectory.

FIG. 8a depicts the geometry of an engagement showing the angle/angle projection 341 of the estimated ballistic trajectory of the airborne target from the weapon-locating radar system measurements or range-resolved ladar measurements and the laser-derived (angle/angle) airborne target trajectory 340 from the backtrack analysis of the vortex measurements in the turbulent wake. A dashed line 353 represents the tangent of the ladar-derived airborne target trajectory curve 340 at a point "P" and the dashed line 354 represents a normal to this curve, which intercepts the ballistic trajectory curve at a point "Q."

Figure 8B:
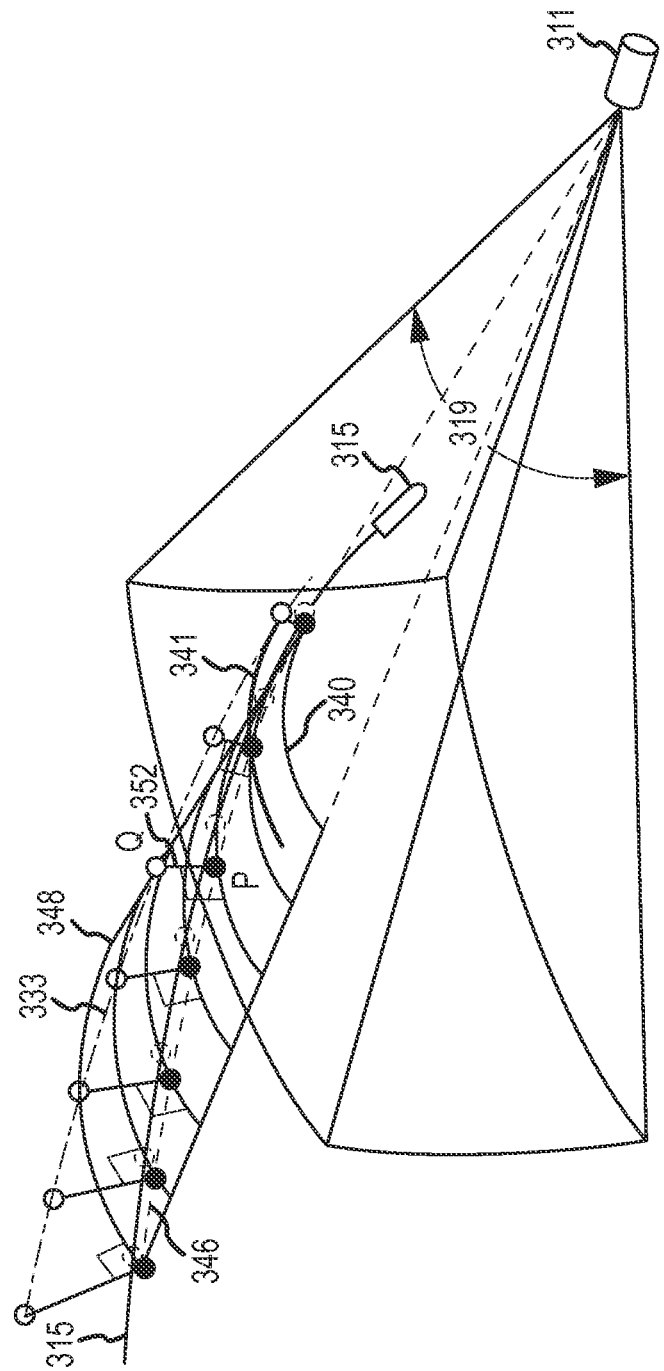

Note that the points on the ballistic trajectory curve 333 in FIG. 8b are plotted here as projection 341 in angle/angle space, but also carry range information. The goal is to associate that range information at all points, Q, on the radar ballistic trajectory curve 333 with the proper angle/angle coordinates on the ladar-derived airborne target trajectory curve 340. Mathematically, this is equivalent to finding the angle/angle coordinates at point P such that the normal to the ladar-derived trajectory curve at P passes through Q.

We begin by assuming both curves can be described by a second order polynomial as defined below:

Ballistic Trajectory 341: $\theta_{EL} = a\theta_{AZ}^2 + b\theta_{AZ} + c$

Ladar-derived Trajectory 340: $\theta_{EL} = d\theta_{AZ}^2 + e\theta_{AZ} + f$

The a, b, and c coefficients for the radar-derived ballistic trajectory curve and the d, e, and f coefficients for the ladar-derived trajectory curve may be found by a second order polynomial (i.e., quadratic) regression analysis of the respective angle/angle measurements according to standard practice. Quality-of-fit metrics such as the Coefficient-of-Determination may also be found according to standard practice. We assume here that a regression analysis process has been completed such that these coefficients are constants.

The slope of the tangent 353 to the ladar-derived trajectory curve 340 is $(2d\theta_{AZ}+e)$. Therefore, the slope of the line segment 352. $\overline{PQ}$ that is normal to the ladar-derived trajectory curve is $(-1/(2d\theta_{AZ}+e))$. With this, an equation for line 354 extending through line segment 352, $\overline{PQ}$, can be written as:

Line Through $$\overline{PQ}: \theta_{EL} = \theta_{EL}(P) - \frac{(\theta_{AZ} - \theta_{AZ}(P))}{2d\theta_{AZ}(P) + e}$$

Now we have two simultaneous equations describing the intersection of the Line through $\overline{PQ}$ and the ballistic trajectory curve at point Q, hence we solve for $\theta_{AZ}(Q)$. Combining, we have:

$$a\theta_{AZ}^2(Q) + b\theta_{AZ}(Q) + c = \theta_{EL}(P) - \frac{(\theta_{AZ}(Q) - \theta_{AZ}(P))}{2d\theta_{AZ}(P) + e}$$

Solving this quadratic equation for the largest root, $\theta_{AZ}(Q)$, which is the non-extraneous root closest to the apogee of the airborne vehicle (note: a is always negative for ballistic trajectory):

$$\theta_{AZ}(Q) = \frac{-\left[b + \frac{1}{2d\theta_{AZ}(P)+e}\right] - \left[\left(b + \frac{1}{2d\theta_{AZ}(P)+e}\right)^2 - 4a\left(c - \theta_{EL}(P) - \frac{\theta_{AZ}(P)}{2d\theta_{AZ}(P)+e}\right)\right]^{1/2}}{2a}$$

The ballistic trajectory will have a range coordinate for the airborne target, R(Q), associated with the azimuth coordinate, $\theta_{AZ}(Q)$. This is the best estimate for the range associated with point P on the ladar-derived trajectory curve. Complete 31) (angle/angle/range) coordinates can now be given for each point P on the ladar-derived airborne target trajectory curve 346 given by $[\theta_{AZ}(P), \theta_{EL}(P), R(Q)]$. This is the information that is communicated to the weapon-locating ladar system to calculate the estimated point-of-origin and the point-of-impact of the airborne target.

We claim:

1. A method for backtracking a trajectory of an airborne target, comprising:
    illuminating with a laser beam a wake trailing the airborne target from a position at which the target is detected backward until the wake is no longer observable, said laser beam having a spatial pattern and a temporal waveform selected to discriminate wake turbulence from naturally occurring atmospheric phenomena;
    detecting laser energy backscattered from molecules, aerosols and particulate matter in the volume of air in and around the wake trailing the airborne target;
    processing the detected laser energy to compute one or more atmospheric flow field images along the wake, each said image including a profile of one or more flow field measurements; and
    processing the profiles of flow field measurements to estimate a backward trajectory of the airborne target from the detected position of the target to the position at which the wake is no longer observable.

2. The method of claim 1, wherein detecting laser energy comprises detecting frequency shifts of the backscattered laser energy, said profile of one or more flow field measurements comprising a spatially resolved radial velocity.

3. The method of claim 1, wherein detecting laser energy comprises detecting a frequency shift as a function of time of the backscattered laser energy, said profile of one or more flow field measurements comprising a spatially resolved radial velocity or derivatives in time or space, moments or functions thereof.

4. The method of claim 1, further comprising:
    adapting the temporal waveform of the laser beam as the beam backtracks the wake from the detected position.

5. The method of claim 4, wherein the temporal waveform is adapted based on the age of the illuminated portion of the wake to optimize the flow field measurement.

6. The method of claim 4, wherein the temporal waveform is adapted to provide different flow field measurements.

7. The method of claim 4, wherein the temporal waveform is adapted for a three-dimensional range-resolved mode to produce a sequence of flow field images at different range slices to estimate the backward trajectory, and wherein the temporal waveform is adapted for a two-dimensional angle/angle mode to produce a flow field image to estimate the backward trajectory.

8. The method of claim 7, wherein the laser beam illuminates the wake in the range-resolved mode from the detected position backwards along a first portion of the backward trajectory and wherein the laser beam illuminates the wake in the angle/angle mode from that position backwards along a second portion of the backward trajectory until the wake is no longer observable.

9. The method of claim 8, further comprising:
switching from the range-resolved mode to the angle/angle mode when the wake is no longer observable in the range-resolved mode.

10. The method of claim 8, further comprising:
prior to illumination of the wake with the laser beam, illuminating with a radio frequency beam the airborne target to determine the detected position of the target and an estimated ballistic trajectory for the target; and
fusing the estimated ballistic trajectory from the radio frequency beam with the estimates from the laser beam in said range-resolved and angle-angle modes to produce the estimate of the backward trajectory.

11. The method of claim 1, further comprising:
adapting a spatial sampling of the detected laser energy in the volume of air in and around the wake in accordance with the flow field measurements.

12. The method of claim 1, wherein the flow field measurements within each flow field image are mapped to a three-dimensional position in Azimuth angle, Elevation angle and range, wherein the backward trajectory is estimated by determining a center of the wake in Azimuth and Elevation angle at each range slice from the flow field measurements and estimating a three-dimensional trajectory through the centers.

13. The method of claim 1, wherein the flow field measurements within the flow field image are mapped to a two-dimensional position in Azimuth angle and Elevation angle, further comprising:
providing an estimated ballistic trajectory for the airborne target;
estimating a sequence of wake centers in Azimuth angle and Elevation angle from the flow field measurements to provide an angular locus;
fitting a curve through the sequence of wake centers of the angular locus to provide the Azimuth angle and Elevation angle components of the backtrack trajectory; and
mapping the range coordinate of the estimated ballistic trajectory where the two-dimensional Azimuth angle and Elevation angle projection of the estimated ballistic trajectory is at the minimum angular separation from any point of the curve to provide the range component of the backward trajectory.

14. The method of claim 1, further comprising:
projecting the backward trajectory past the position at which the wake is no longer observable to estimate a point-of-origin of the airborne target.

15. The method of claim 1, further comprising:
processing the flow field measurements to assign a target class of the airborne target.

16. The method of claim 15, further comprising:
projecting the backward trajectory past the position at which the wake is no longer observable to estimate a point-of-origin of the airborne target; and
refining the estimate of the point-of-origin based on the assigned target class.

17. The method of claim 15, further comprising:
projecting the backward trajectory past the position at which the wake is no longer observable to estimate a point-of-origin of the airborne target;
directing counter fire at the estimated point-of-origin; and
using the assigned target class to control the counter fire.

18. The method of claim 15, further comprising:
using the assigned target class to adapt the temporal waveform of the laser beam.

19. The method of claim 15, further comprising:
illuminating with a either a radio frequency beam or the laser beam the airborne target to extract target measurements; and
using both the flow field measurements of the turbulent wake and the target measurements to assign the target class.

20. A method for backtracking a trajectory of an airborne target, comprising:
illuminating with a radio frequency beam the airborne target to determine a detected position of the target;
illuminating with a laser beam a wake trailing the airborne target from the detected position backward until the wake is no longer observable, said laser beam having a spatial pattern and a temporal waveform selected to discriminate wake turbulence from naturally occurring atmospheric phenomena;
detecting laser energy backscattered from molecules, aerosols and particulate matter in the volume of air in and around the wake trailing the airborne target;
processing the detected laser energy to compute one or more atmospheric flow field images along the wake between the detected and observable positions, each said image including a profile of one or more flow field measurements;
processing the profiles of flow field measurements to estimate a backward trajectory of the airborne target from the detected position of the target to the position at which the wake is no longer observable;
projecting the backward trajectory past the position at which the wake is no longer observable to estimate a point-of-origin of the airborne target; and
directing counter fire at the estimated point-of-origin.

21. The method of claim 20, wherein illumination of the airborne target with the radio frequency beam provides an estimated ballistic trajectory, further comprising:
adapting the temporal waveform of the laser beam for a three-dimensional range-resolved mode from the detected position backwards to produce a sequence of flow field images at different range slices to estimate the backward trajectory;
adapting the temporal waveform of the laser beam for a two-dimensional angle/angle mode from that position backwards to the position at which the wake is no longer observable to produce a flow field image to estimate the backward trajectory, and
fusing the estimated ballistic trajectory from the radio frequency beam with the estimates from the laser beam in said range-resolved and angle-angle modes to produce the estimate of the backward trajectory.

22. The method of claim 20, further comprising:
processing the flow field measurements to assign a target class of the airborne target; and
using the assigned target class to perform at least one of the following steps,
refine the estimate of the point-of-origin;
control the counter fire; and
adapt the temporal waveform.

23. A system for backtracking a trajectory of an airborne target, comprising:
a laser transmitter configured to generate a laser beam having a spatial pattern and a temporal waveform selected to discriminate wake turbulence from naturally occurring atmospheric phenomena, said laser beam illuminating a wake trailing the airborne target from a position at which the target is detected backward until the wake is no longer observable;
a ladar receiver comprising one or more detectors that detect laser energy backscattered from molecules, aerosols and particulate matter in the volume of air in and around the wake trailing the airborne target;
a ladar signal processor configured to process the detected laser energy to compute one or more atmospheric flow field images along the wake between the detected and observable positions, each said image including a profile of one or more flow field measurements; and
a system processor configured to process the profiles of flow field measurements to estimate a backward trajectory of the airborne target from the detected position of the target to the position at which the wake is no longer observable.

24. The system of claim 23, further comprising:
a radar system configured to illuminate the airborne target with a radio frequency beam to determine the detected position and to provide an estimated ballistic trajectory for the airborne target,
wherein said laser transmitter, ladar receiver, signal processor and system processor are configured to adapt the temporal waveform of the laser beam for a three-dimensional range-resolved mode from the detected position backwards to produce a sequence of flow field images at different range slices to estimate the backward trajectory and to adapt the temporal waveform of the laser beam for a two-dimensional angle/angle mode from that position backwards to the position at which the wake is no longer observable to produce a flow field image to estimate the backward trajectory, and
wherein the system processor is configured to fuse the estimated ballistic trajectory from the radio frequency beam with the estimates from the laser beam in said range-resolved and angle-angle modes to produce the estimate of the backward trajectory.

* * * * *